US005413283A

United States Patent [19]

Gimple et al.

[11] Patent Number: 5,413,283

[45] Date of Patent: May 9, 1995

[54] QUICK DISCONNECT FOR AN AUTOMATIC COATING DEVICE

[75] Inventors: James J. Gimple, Oregon, Ohio; David L. Hamilton, Belleville, Mich.; Daniel C. Hughey; Chris M. Jamison, both of Indianapolis, Ind.; David M. Seitz, Temperance, Mich.

[73] Assignee: Ransburg Corporation, Indianapolis, Ind.

[21] Appl. No.: 172,542

[22] Filed: Dec. 22, 1993

Related U.S. Application Data

[60] Division of Ser. No. 894,089, Jun. 5, 1992, which is a continuation-in-part of Ser. No. 618,053, Nov. 26, 1990, abandoned.

[51] Int. Cl.[6] ........................ B05B 5/025; F16L 33/18

[52] U.S. Cl. .................................... 239/600; 239/690; 285/345; 285/347; 285/351

[58] Field of Search ................ 239/600, 690, 696–708; 285/345, 347, 351

[56] References Cited

U.S. PATENT DOCUMENTS

| | | | |
|---|---|---|---|
| H804 | 8/1990 | Dobbins | 285/345 |
| 3,222,094 | 12/1965 | Robinson et al. | 285/347 |
| 3,574,359 | 4/1971 | Klein | 285/351 |
| 3,746,253 | 7/1973 | Walberg | 239/705 |
| 3,900,221 | 8/1975 | Fouts | 285/351 |
| 4,836,584 | 6/1989 | Baker | 285/351 |
| 4,995,560 | 2/1991 | Lasley et al. | 239/708 |

*Primary Examiner*—Karen B. Merritt

*Attorney, Agent, or Firm*—Barnes & Thornburg

[57] ABSTRACT

A quick disconnect for a coating material dispensing device includes a passageway through which coating material is supplied from a supply conduit for dispensing. The supply conduit includes a first region along its length provided with a surrounding O-ring. The passageway includes a sidewall providing a second region along its length in which the first region resides when the supply conduit is positioned in a use orientation in the dispensing device. The second region compresses the O-ring into fluid-tight sealing orientation against the passageway sidewall in the second region when the supply conduit is inserted into the passageway into its use orientation.

4 Claims, 4 Drawing Sheets

FIG. 2
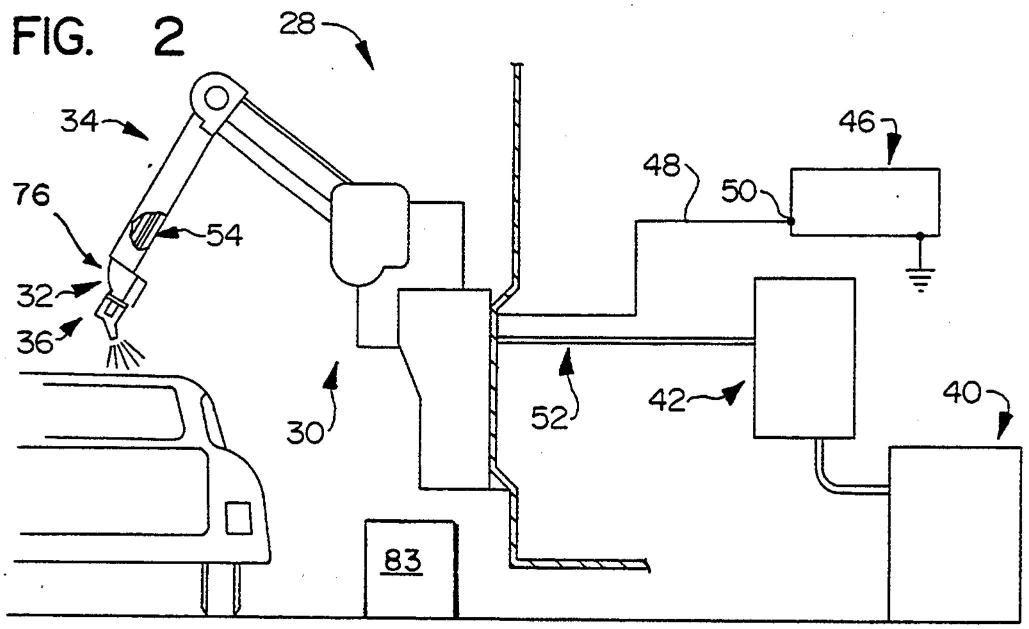
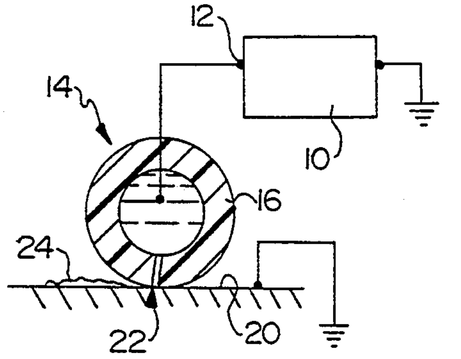
PRIOR ART
FIG. 1
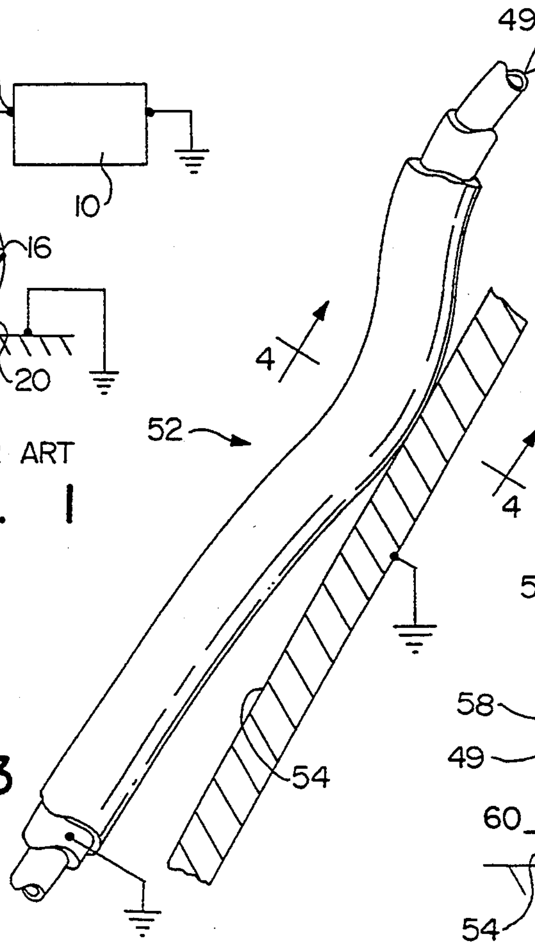
FIG. 3
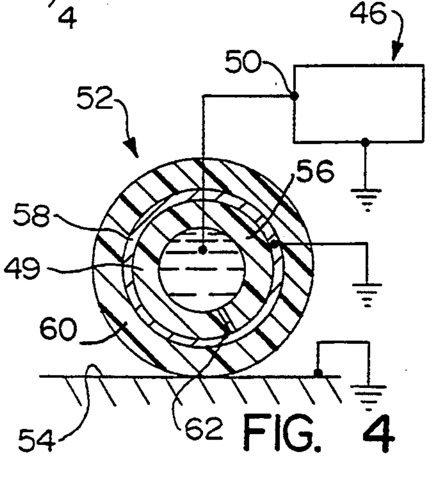
FIG. 4

QUICK DISCONNECT FOR AN AUTOMATIC COATING DEVICE

This is a divisional application of U.S. Ser. No. 07/894,089, filed Jun. 5, 1992, which is a continuation -in- part application of Ser. No. 07/618,053, filed Nov. 26, 1990, (now abandoned).

This invention relates to coating material dispensing systems. It is disclosed in the context of automated systems, such as robot systems, for dispensing highly conductive coatings.

Mechanisms by which electrically conductive coating materials can be isolated from ground are called voltage blocks. Some voltage blocks are illustrated and described in, for example, U.S. Pat. No. 4,878,622, U.S. Pat. No. 4,982,903 and PCT/US 89/02473, and in certain references cited in those disclosures. Those disclosures are hereby incorporated herein by reference. The term "voltage block" is used throughout this application. It is to be understood, however, that these devices function to minimize, to the extent they can, the flow of current. Such current otherwise would flow from a dispensing device maintained at high electrostatic potential through the conductive coating material being dispensed thereby to the grounded source of such coating material, degrading the electrostatic potential on the dispensing device. Thus, "voltage block", as used herein is intended to include systems wherein coating material supplies are isolated from ground and "float" at some intermediate-magnitude or high-magnitude electrostatic potential with respect to ground.

In the coating of articles in assembly line fashion with highly conductive coating materials, such as water base paints, using automated equipment, the coating material dispensing device is mounted at the end of, for example, a robot arm. The arm illustratively is constructed from some electrically highly conductive material which is maintained at ground potential. The conduit through which the coating material is delivered extends along the robot arm from a voltage block to the dispensing device.

A problem associated with such a system is that the wall of the conduit can deteriorate as a result of the proximity of the highly charged conductive coating and the grounded surfaces of the robot arm. Deterioration of the wall of the conduit can result in pinholes in the wall of the conduit, leakage of the highly conductive coating into the interior of the robot arm, with its attendant mess, and the shorting of the high-magnitude power supply through the conductive coating in the conduit and the pinhole to the robot arm. This degrades the potential difference across the dispensing device to the articles being coated thereby, negatively impacting the coating of the articles.

Certain explanations have been advanced for the pinholing phenomenon. According to one, the conduit may be analogized to the insulation around a conductor carrying a high voltage. If the high voltage conductor is designed with inadequate insulation or corona suppression, the conductor's insulation can rapidly deteriorate and exhibit pinholing. According to this analogy, a conduit carrying conductive coating material, such as water base paint, if improperly designed, will exhibit the same phenomenon. A properly designed high voltage cable includes a conductor, a thickness of highly resistive material, such as fluorinated ethylene propylene (FEP) or polyethylene, as an insulator, a surrounding layer of conductive material coupled to ground, and a layer of scuff- and abrasion-resistant material to protect the assembly from mechanical abrasion.

An alternative explanation for the pinholing problem in conduits carrying conductive coating materials is that the charge carried by the conductive coating material in the conduit concentrates at the conduit wall opposite ground points closely spaced from the outside of the conduit. As a result, the field across the insulative wall of the conduit concentrates at these ground points. The material from which the wall of the conduit is constructed begins to break down, perhaps chemically, perhaps aided by the high field intensity in the vicinity of the ground points, and pinholes result. However the pinholes form, they continue to be a significant problem in these kinds of installations for the reasons noted above.

According to the invention, a coating material dispensing system comprises an electrostatic high potential supply having an output terminal on which the supply maintains a high electrostatic potential, a source of coating material, a dispenser for dispensing the coating material, and means for coupling the dispenser to the source of coating material. The output terminal is coupled to supply potential to the coating material dispensed by the dispenser. The means for coupling the dispenser to the source of coating material comprises a voltage block substantially to interrupt the electrical path through the coating material from the terminal to the coating material supply. The means for coupling the dispenser to the source of coating material further comprises a length of electrically non-conductive conduit around which is provided a layer of electrically non-insulative shield coupled between the voltage block and the dispenser.

According to an illustrative embodiment of the invention, the electrically non-insulative shield is coupled to ground. Illustratively, the electrically non-insulative shield is coupled to ground adjacent the dispenser. Further, illustratively, a layer of scuff- and abrasion-resistant material surrounds the layer of electrically non-insulative shield.

Illustrative, the electrically non-conductive conduit is selected from the group consisting of fluorinated ethylene propylene and polyethylene.

Further, illustratively, the voltage block comprises a peristaltic device having a length of resilient conduit and means for movably contacting the length of resilient conduit at multiple contact points for substantially dividing the flow of coating material to the dispenser into discrete slugs of coating material.

According to another aspect of the invention, a device is provided for atomizing and dispensing a first liquid coating material onto a first group of one or more articles to be coated by the first coating material and then for dispensing a second liquid coating material onto a second group of one or more articles to be coated by the second coating material. The device includes at least one atomizing nozzle providing a first flow rate of the first and second coating materials required for high quality atomization of the first and second coating materials. The device further includes a second nozzle providing a second and substantially greater flow rate of the first and second coating materials at lower atomization quality than the first nozzle or no atomization. A conduit couples the second nozzle to the first nozzle. A valve controls the flow of liquid to the second nozzle. Operation of the valve between dispensing of the first coating material onto articles to be coated thereby and dispensing of the second coating material onto articles to be coated thereby flushes excess coating material from the dispensing device.

According to this aspect of the invention, the dispensing device is moved between a position in which it dispenses coating material onto articles to be coated thereby and a position in which it discharges excess coating material into the waste container.

According to yet another aspect of the invention, a quick disconnect is provided for a coating material dispensing device. The dispensing device includes a passageway through which coating material is supplied from a supply conduit for dispensing. The supply conduit includes a first region along its length provided with a surrounding O-ring. The passageway includes a sidewall providing a second region along its length in which the first region resides when the supply conduit is positioned in a use orientation in the dispensing device. The second region compresses the O-ring into fluid-tight sealing orientation against the passageway sidewall in the second region when the supply conduit is inserted into the passageway into its use orientation.

Illustratively, according to this aspect of the invention, the passageway comprises a third region having a first transverse sectional area to ease insertion of the supply conduit into the third region. The second region has a second and smaller transverse sectional area to compress the O-ring into the fluid tight sealing orientation against the passageway as the first region is inserted through the third region into the second region and into its use orientation.

Additionally, illustratively, the quick disconnect further comprises a second O-ring provided on the first region adjacent the first O-ring.

The invention my best be understood by referring to the following description and accompanying drawings which illustrate the invention. In the drawings:

FIG. 1 is a highly fragmentary transverse sectional view of a detail of a prior art installation illustrating a problem some such installations exhibit;

FIG. 2 illustrates a diagrammatic, partly broken away and partly sectional side elevational view of a system constructed according to the present invention;

FIG. 3 illustrates a diagrammatic and greatly enlarged fragmentary Side elevational view of the system illustrated in FIG. 2;

FIG. 4 illustrates a sectional view of the detail of FIG. 3, taken generally along section lines 4—4 thereof;

Figure 5:
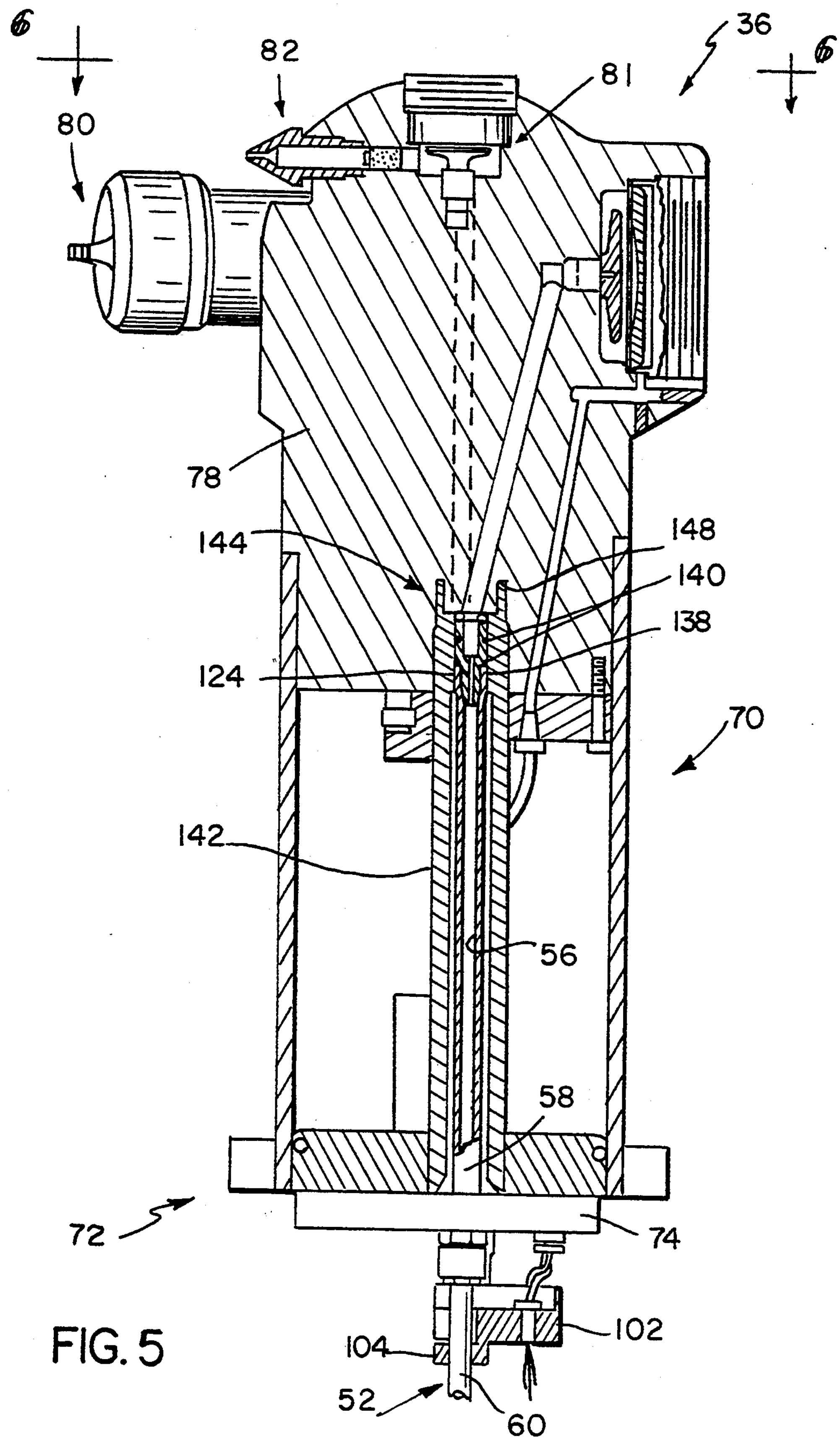
FIG. 5 illustrates an enlarged sectional side elevational view of certain details of the system illustrated in FIG. 2, taken generally along section lines 5—5 of FIG.6.

As best illustrated in FIG. 1, a prior art arrangement for dispensing conductive coating material includes a high magnitude potential supply 10, the high magnitude potential output terminal 12 of which is coupled to the highly conductive coating material being conveyed by a conduit 14, between a voltage block (not shown) and a dispensing device (not shown). Conduit 14 which is illustrated as including a monolayer 16 of an electrically non-conductive material such as polyethylene, FEP or nylon, typically extends internally of a robot arm, the inner surface 20 of which is maintained at ground potential. As previously discussed, formation of a pinhole 22 through conduit 14 results in the leakage 24 of the highly conductive coating material into the interior of the robot arm with its attendant mess.

As best illustrated in FIG. 2, the system 28 of the present invention comprises a coating robot 30, such as a General Motors-Fanuc Model P-150 robot, at the remote end 32 of the arm 34 of which is mounted a coating dispensing device 36, such as a Ransburg Model EMFD dual-headed, electrostatic, water base paint spray gun. Depending upon the application and/or the type of dispensing device employed in a particular coating operation, it may be necessary to mount the dispensing device 36 on an insulator (not shown) to isolate it electrically from the robot arm 34.

The dispensing device 36 is selectively coupled to a source 40 of water base coating material through a voltage block 42, for example, of the type described in U.S. Pat. No. 5,154,357. A manifold (not shown) is provided adjacent the remote end 32 of the robot arm 34 and is coupled between the voltage block 42 and the dispensing device 36 so! that dispensing of coating material can be halted at appropriate times. The manifold includes valves coupled through robot am 34 to such services as relatively higher pressure compressed air, relatively lower pressure compressed air, and solvent to aid in cleaning and drying of the dispensing device 36 at appropriate times, such as during changes in the color of coating material being dispensed.

The system also includes a high-magnitude electrostatic potential supply 46 of any of a number of known types coupled by a high voltage cable 48 to the dispensing device 36 In this way, high magnitude electrostatic potential is impressed upon the coating material 49 dispensed therefrom. The high-magnitude potential output terminal 50 of the high-magnitude potential supply 46 can also be coupled directly to the stream of highly conductive coating material 49 as the coating material exits the voltage block 42, and this option is intended to be illustrated in FIG. 3.

Referring now specifically to FIGS. 3–4, a conduit 52 delivers the highly conductive coating material 49 from the voltage block 42 through the interior 54 of the robot arm 34 to the manifold and the dispensing device 36 at the remote end 32 of robot arm 34. The conduit 52 includes an electrically non-conductive inner layer 56 of, for example, FEP or polyethylene, a middle, electrically conductive shield layer 58 of, for example, a conductive polyethylene or plastic and an outer, scuff- and abrasion-resistant layer 60 of, for example, electrically non-conductive polyurethane. The shield layer 58 is grounded, illustratively at the remote end 32 of the robot arm 34. Conduit 52 illustratively is Graco type 53710 0.25 inch (about 6.4 mm) inside diameter conduit.

With the illustrated system 28, if a pinhole 62 forms in layer 56, the presence of the pinhole 62 will become immediately apparent. The magnitude of the output voltage at terminal 50 will drop and the output current through terminal 50 will increase due to current flow to the ground provided to layer 58. This will permit the system 28 to be shut down and the defective conduit 52 replaced before any of the coating material 49 leaks out into the interior 54 of the robot arm 34.

Figure 6:
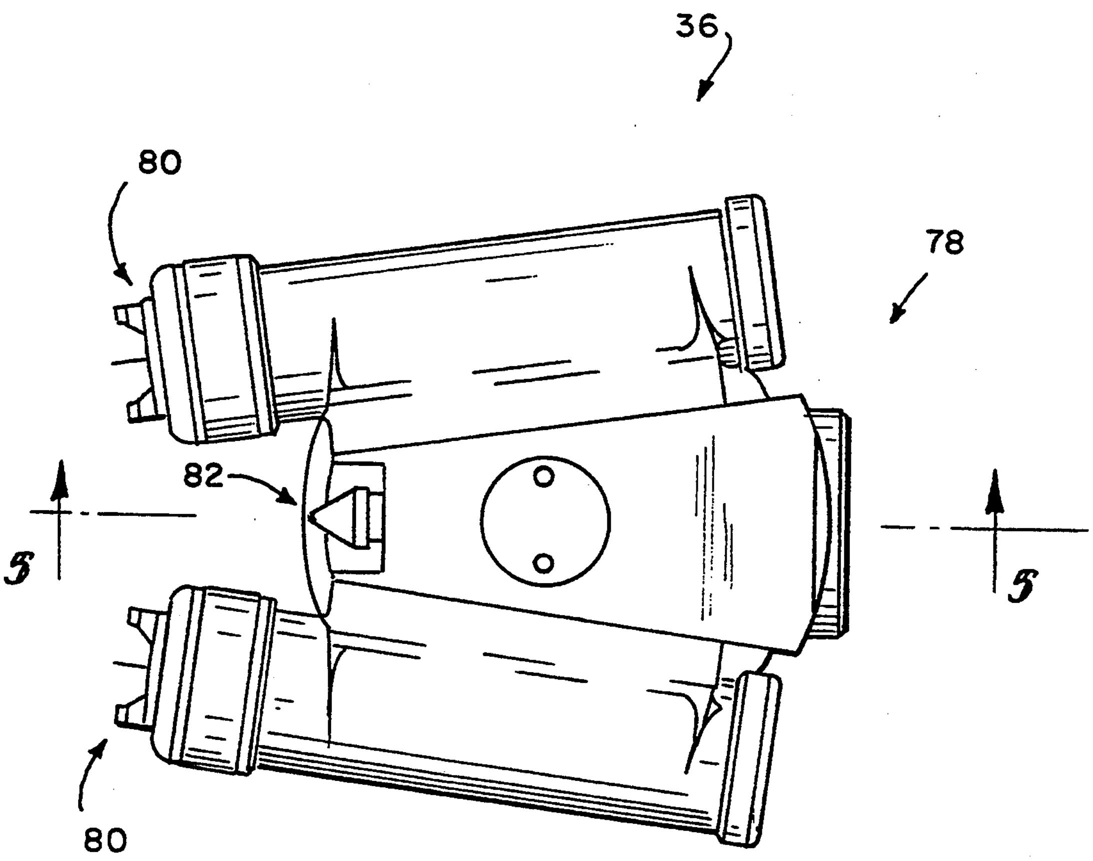
FIG. 6 illustrates an end or top view of the details of FIG. 5, taken generally along section lines 6—6 of FIG. 5.

Certain aspects of device 36 will now be described with reference to FIGS. 5–8. Device 36 includes a generally right circular cylindrical body 70 closed at one end 72 by a manifold 74 which mates to a mounting plate 76 (FIG. 2) at the remote end 32 of the robot arm 34. The other end of body 70 is closed by a head 78 which illustratively is a dual spray head. As best illustrated in FIG. 6, head 78 includes two spray nozzles 80 of known construction for finish-quality atomization of coating materials. The axes of nozzles 80 intersect in front of nozzles 80 in the region where a surface to be coated is presented during coating application. Head 78 also includes a valve 81 controlling flow to a third nozzle 82. Nozzle 82 is not a finish quality atomizing nozzle, but rather is a high-capacity dump nozzle for use when it is desired to empty a large amount of coating material and/or solvent from device 36, and the conduit 52 supplying device 36, quite quickly into a waste receptacle 83 (FIG. 2) maintained near the robot arm 34, such as during a color change.

A primary concern with prior art robot-mounted dispensing devices for dispensing water-base or organic solvent-base coatings is the speed at which color change can be achieved. In prior art dispensing devices, a pre-change color and solvent dump line extends from the dispensing device back through the robot arm. The excess pre-change color and the solvent which has been used to flush it from the supply conduit and dispensing device is typically conducted through this line to a waste receptacle at the other end of the robot arm. Since the coating material in the supply conduit was at voltage, at least just prior to the initiation of the color-change cycle, the pre-change color and solvent dump line was susceptible to the same pinholing phenomenon previously described.. Nozzle 82 overcomes the need for the return transmission of the excess pre-change color and flushing solvent back through the robot arm. In So doing, it also eliminates any tendency toward pinholing of the dump line and the attendant leaking of excess color and solvent into the robot arm through dump line pinholes by entirely eliminating the need for the dump line. The robot is controlled at the beginning of each color-change cycle to position device 36 over waste receptacle 83. Nozzle 82 is then triggered on in combination with finish quality atomizing nozzles 80 and solvent is supplied to all three, permitting the pre-change color and flushing solvent to be emptied quickly from the coating material supply conduit 52 and device 36 in much less time than was possible with the prior art technique. At the same time, or substantially the same time, nozzles 80 are cleaned in preparation for dispensing of the next color to be dispensed from nozzles 80.

Nozzle 82 illustratively is pneumatically triggered as the robot positions device 36 over the waste container 83 by an air signal coupled through the robot wrist manifold from a compressed air source under the control of a coating sequence controller of known configuration.

Figures 7, 8:
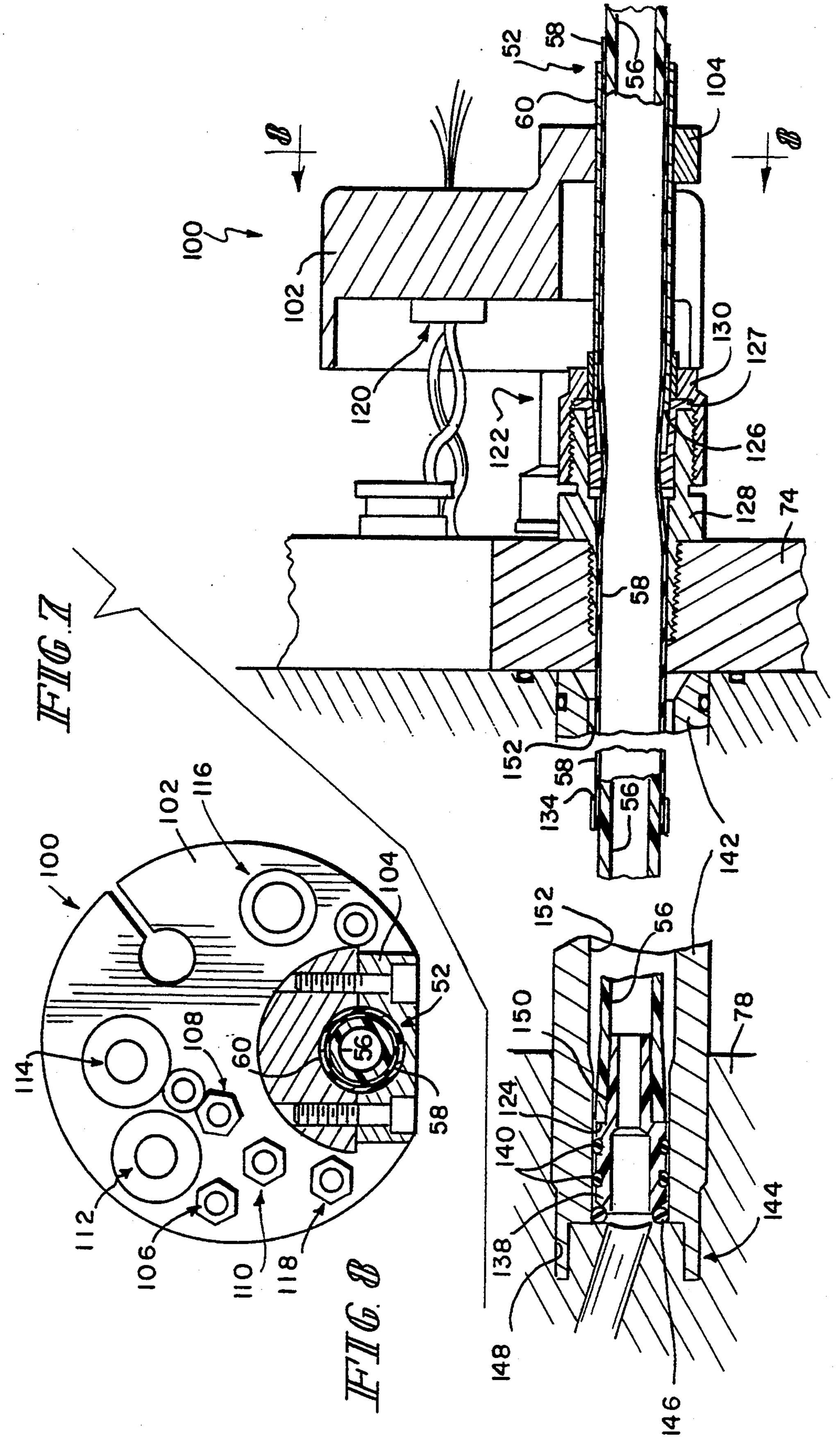
FIG. 7 illustrates a further enlarged view of certain details of FIG. 5.
FIG. 8 illustrates a fragmentary sectional view of a detail of FIG. 7 taken generally along section lines 8—8 of FIG. 7.

Referring now particularly to FIGS. 7–8, a novel quick-disconnect for use with the device 36 will be described. As previously noted, conduit 52 includes electrically non-conductive inner layer 56, electrically conductive middle shield layer 58 and scuff- and abrasion-resistant outer layer 60. At the robot wrist, conduit 52 passes through a hose clamp 100 including a larger, generally right circular cylindrical portion 102 and a smaller, generally rectangular prism shaped portion 104. Both portions 102, 104 are provided with generally right circular cylindrical recesses to accommodate conduit 52. Portions 102, 104 are Joined, clamping conduit 52 between them, by socket head cap screws. Portion 102 is provided with pilot air signal fittings 106 for the air pressure regulator, 108 for device 36 triggering, 110 for dump valve 81 triggering, air fittings 112 for shaping (fan) air, 114 for atomizing air, fitting 116 for a dump line, and fitting 118 for exhaust air. A separate fitting 120 is provided for making the necessary electrical connections to the dispensing device 36. Although one of the purposes of providing the dump nozzle 82 in device 36 is to overcome the need to provide a dump line extending back up the robot arm 34, under certain circumstances, a user may wish to employ a dump line. Clamp 100 is provided with fitting 116 to provide this flexibility, or optionally, to provide air for drying of the dump nozzle 82. When the dump nozzle 82 is used, and therefore the dump line up the robot: arm 34 is unused, it my be useful to blow air through the otherwise idle dump lime to dry the dump nozzle 82. When this option is used, a check valve (not shown) is located at the dispensing device 36 end of the dump line to prevent fluid flow up the robot arm 34.

A fitting 122 such as, for example, a Swagelok TM type 316EIZ fitting, is positioned on conduit 52. During the assembly of the conduit 52 and related service lines to the clamp 100 and thence to the dispensing device 36, the scuff-resistant layer 60 of conduit 52 is stripped from the end 124 of conduit 52 back sufficiently far that the end 126 of scuff-resistant layer 60 will lie within fitting 122. This distance typically will be on the order of 8.87 inches (about 22.5 cm). Fitting 122 includes an electrically conductive hard resin ferrule 127 which overlies the end 126 Of layer 60, a fitting portion 128 with threads which engage complementary threads in the robot wrist manifold 74, and ferrule nut 130 for capturing the ferrule 127 between portions 128 and 130 the Shield 58 is mechanically grounded by virtue of the electrically conductive resin ferrule 127. Fitting 122, when assembled, compresses conduit 52 Slightly in their region of contact, fixing the position of fitting 122 with respect to the end 124 of conduit 52. About 0.66 inch (1.67 cm) beyond the manifold 74, the conductive shield is stripped from the inner layer 56. The end 134 of the conductive shield 58 is dressed by rolling about a 0.156 inch (about 4 mm) cuff of it back over itself. During the preparation of conduit 52, it is important not to nick or cut any of layers 56, 58 or 60 anywhere other than as specifically set forth. It must be remembered that conduit 52 typically will be carrying electrically conductive materials at high magnitude electrostatic potentials.

A barbed fitting 138 is provided at end 124. Barbed fitting 138 is provided with two O-ring grooves which are fitted with O-rings 140. The cylindrical body 70 of device 36 is provided with a fluid isolation tube 142 which extends from the manifold 74 up into the head 78 thereof. In order to make the shielded (58) conduit 52 effective, proper stripping and termination of conduit 52 is necessary. The length of inner layer 56 extending from the manifold 74 is sufficient to isolate the high-magnitude electrostatic potential at the barbed fitting 138 electrically from the grounded manifold 74. The head end 144 of tube 142 has a reduced sidewall thickness and an O-ring 146 and fits Into a right circular cylindrical groove 148 in head 78. Prior to insertion of the head end 144 of tube 142 into groove 148, a small amount of a suitable dielectric grease is applied and spread evenly around the upper, closed end of groove 148.

The head end 144 of tube 142 is also provided with a reduced diameter length 150 of its central passageway 152. During the final assembly of head 78 to manifold plate 74, O-rings 140 are lubricated with a small amount of petroleum Jelly and inserted into tube 142. Pushing of conduit 52 into tube 142 compresses O-rings 140 against the sidewall of tube 142 in the reduced diameter region 150 of tube 142 and O-ring 146 against head 78, sealing conduit 52 to head 78.

What is claimed is:

1. In combination, a quick disconnect and a coating material dispensing device, the dispensing device including a passageway through which coating material is supplied from a supply conduit for dispensing, the supply conduit including a first region along its length, the first region provided with a surrounding O-ring adjacent a first end thereof, the passageway including a sidewall providing a second region along its length in which the first region resides when the supply conduit is positioned in a use orientation in the dispensing device, the second region compressing the O-ring into fluid-tight sealing orientation against the passageway sidewall in the second region when the supply conduit is inserted into the passageway into its use orientation, the first region comprising a length of electrically non-conductive conduit around which is provided a layer of electrically non-insulative shield, the layer of non-insulative shield being terminated within the second region but remote from the first end of the first region.

2. The combination of claim 1 wherein the passageway comprises a third region having a first transverse sectional area to ease insertion of the supply conduit into the third region, the second region having a second and smaller transverse sectional area to compress the O-ring into the fluid tight sealing orientation against the passageway as the first region is inserted through the third region into the second and into its use orientation.

3. The combination of claim 1 or 2 and further comprising a second O-ring provided on the first region adjacent the first O-ring.

4. The combination of claim 1 or 2 wherein the supply conduit further comprises a layer of scuff- and abrasion-resistant material around the layer of electrically non-insulative shield.

* * * * *